No. 864,689. PATENTED AUG. 27, 1907.
C. H. REDMAN.
FIRE ESCAPE.
APPLICATION FILED MAY 13, 1905. RENEWED FEB. 7, 1907.

Witnesses
Ivan Konigsberg
H. D. Barmore

Inventor
Charles H. Redman
By his Attorney

UNITED STATES PATENT OFFICE.

CHARLES H. REDMAN, OF NEWARK, NEW JERSEY, ASSIGNOR TO WILLIAM C. BAIRD, OF NEW YORK, N. Y.

FIRE-ESCAPE.

No. 864,689.  Specification of Letters Patent.  Patented Aug. 27, 1907.

Application filed May 13, 1905, Serial No. 260,227. Renewed February 7, 1907. Serial No. 356,258.

*To all whom it may concern:*

Be it known that I, CHARLES H. REDMAN, a citizen of the United States of America, residing at Newark, in the county of Essex and State of New Jersey, have invented certain new and useful Improvements in Fire-Escapes, of which the following is a specification, reference being had to the accompanying drawings, forming part of the same, in which—

Figure 1:
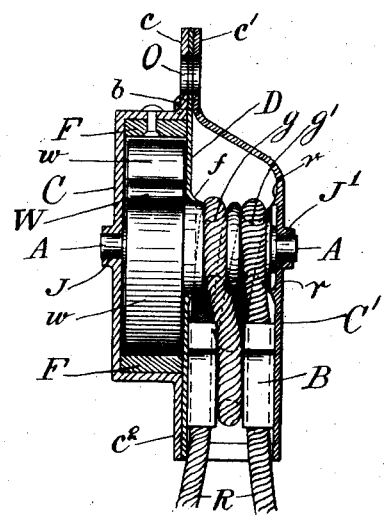
Figure 2:
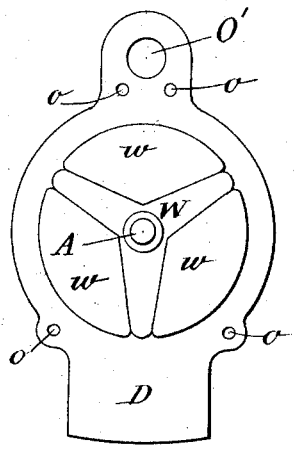
Figure 3:
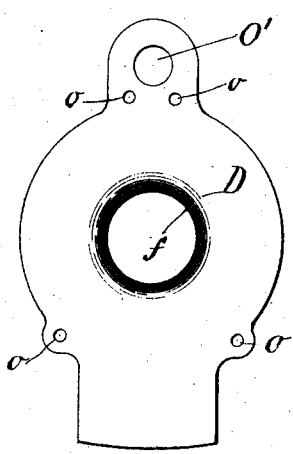
Figure 4:
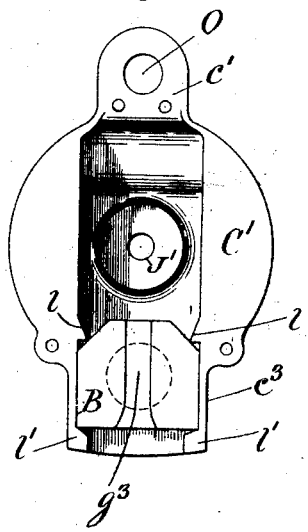
Figure 5:
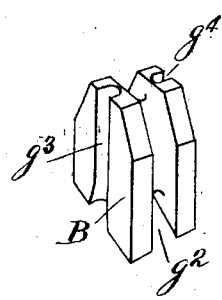

Figure 1, is a central, vertical, sectional view of the case of a device embodying my invention, showing also in full lines other parts of the device. Fig. 2, is a face view of the same, device, but having that part of the case which carries the friction band, removed. Fig. 3, is a face view of the supporting diaphragm or plate of such device. Fig. 4, is a face view of the remaining portion of the case, and of the friction block therein. Fig. 5, is a view in perspective of said friction block.

This invention relates to fire escapes in which a rope is provided, with which a person may lower himself from an upper floor of a building, and a friction device of some sort is also provided to control the movement of the said rope.

It relates more particularly to a friction device in which a governor is provided in the form of a star wheel, retarded by friction weights, bearing against a friction band on the interior face of a circular case.

The general idea involves a friction block with a rope running up one side, over an axle, down another side of the block and around it, then up a third side, again over the axle and then down the fourth side of the block to a loop or fastening to which the user secures himself. The axle named is also provided with a star wheel which with the adjacent friction pieces or weights and the friction band, constitutes the governor.

Difficulties have been experienced with former devices of this character, in that the rope would ride out of the grooves provided for it on the axle and be crowded against the star wheel or between working parts of the frame; also in holding the block in position and in securing sufficient strength in the device without making it unduly heavy or expensive.

My invention consists in improvements in these features.

C, C', is a case formed in two parts, one C, having a circular depression to accommodate the governor friction band and extensions $c$, $c^2$, to receive the securing bolts $b$, to provide a cover for the block, a journal bearing J, for one end of the axle and an orifice O for the device by which the whole is suspended in place. The other part C', has a depression for holding that part of the axle over which the rope is to pass, with a second journal bearing J', for the other end of the axle; another for the block, with lugs $l$, $l'$, for holding it in position, extensions $c'$, $c^3$, to match $c$, $c^2$, and a beveled ring $r$, to assist in keeping the rope in proper position.

Between parts C and C', I locate a diaphragm D. Its main purpose is to separate the governor portion from the rope carrying portion of the case, but I have so constructed it that it accomplishes further functions. First I create around the orifice for the passage of the axle, a beveled flange $f$, which prevents the rope from crowding itself out of position; next I extend it so as to provide orifices $o$, for the securing bolts $b$, and O' for the suspending device, I construct it of plate steel and by reason of its form and arrangement and the strength thereby secured, I am enabled to use cast metal for the parts C, C', of the case, which enables me to construct the device at much less cost than would otherwise be the case.

A is the axle provided with grooves $g$, $g'$, for the rope, so arranged as to come upon one side of diaphragm D, and a star wheel W, arranged to come upon the other side of said diaphragm.—This wheel is preferably three pointed, the points extending not more than about 80 percent of the distance from the center of the wheel to the interior face of the friction band. This friction band F, is preferably made of leather with its ends riveted fast to the case C, and extending entirely about the interior face of the case.

B is the friction block, preferably circular. It has a groove $g^2$, about its two opposite sides and other grooves $g^3$, $g^4$, in its other vertical sides. It is formed to fit in the part C' of the case, between lugs $l$ and $l'$.

$w$, are the friction weights, constructed with curved faces to bear against the friction band F, and others to fit between the points of the star wheel W. They should substantially so fill the space between the said points and the friction band, that they have only sufficient play to fall away from the friction band when their carrying star point reaches a position about 30 degrees from a horizontal line diametrically through the axle, and their faces should be about from one fourth to one sixth of the diameter of the interior circle of the band.

In use the rope R, is led up through groove $g^4$, over the axle in groove $g$, down and around block B in groove $g^2$, again over the axle, in groove $g^1$, and down through groove $g^3$, the end below said last named groove being preferably looped to hold a person or a carrier for a person.

The action of the device will be apparent, the friction of the rope in the grooves retards the movement of the rope and the movement of the rope operates the governor. The rope being, as described, freed from all possibility of fouling, moves smoothly and regularly, the block is held firmly in place, and the descent is safely accomplished.

What I claim as my invention and desire to secure by Letters Patent is:—

In a friction block, provided with a friction piece, a grooved axle, adapted to receive a rope, and a star wheel governor, the combination therewith of a case in two parts, one of which is adapted to receive the friction piece and is provided with lugs adapted to hold it in position, as set forth, together with a diaphragm intermediate said two case parts, a beveled ring upon the interior face of the case part holding the grooved part of the axle, concentric with the axle bearing, corresponding in size to the adjacent flange of said grooved axle, and a corresponding beveled flange upon the adjacent face of said diaphragm, all substantially as set forth.

In testimony whereof, I have signed my name to this specification in the presence of two subscribing witnesses, this first day of May 1905.

CHARLES H. REDMAN.

Witnesses:
C. ELMER BIRDSALL,
ORLANDO A. HARDING.